US009965679B2

(12) United States Patent
Ghatage et al.

(10) Patent No.: US 9,965,679 B2
(45) Date of Patent: May 8, 2018

(54) CAPTURING SPECIFIC INFORMATION BASED ON FIELD INFORMATION ASSOCIATED WITH A DOCUMENT CLASS

(71) Applicant: Accenture Global Services Limited, Dublin (IE)

(72) Inventors: Prakash Ghatage, Bangalore (IN); Ramesh Jonnavithula, Bangalore (IN); Sunil Balugari, Bangalore (IN); Naveen Kumar Thangaraj, Salem (IN); Satyendra S. Shinde, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 171 days.

(21) Appl. No.: 14/633,523

(22) Filed: Feb. 27, 2015

(65) Prior Publication Data

US 2016/0125237 A1  May 5, 2016

(30) Foreign Application Priority Data

Nov. 5, 2014  (IN) .......................... 5580/CHE/2014

(51) Int. Cl.
*G06K 9/18* (2006.01)
*G06K 9/00* (2006.01)
*G06K 9/20* (2006.01)

(52) U.S. Cl.
CPC ....... *G06K 9/00463* (2013.01); *G06K 9/2063* (2013.01); *G06K 9/2081* (2013.01)

(58) Field of Classification Search
None
See application file for complete search history.

(56) References Cited

U.S. PATENT DOCUMENTS 4,949,392 A  8/1990 Barski et al.
5,131,053 A  7/1992 Bernzott et al.
(Continued)

FOREIGN PATENT DOCUMENTS

EP  1 956 518 A1  8/2008

OTHER PUBLICATIONS

Wikipedia article Filename extension, available as of 2008.*
(Continued)

*Primary Examiner* — Mark Roz
(74) *Attorney, Agent, or Firm* — Harrity & Harrity, LLP

(57) ABSTRACT

A device may obtain a document, of a document type, from which specific information is to be captured. The specific information to be captured may depend on a document class associated with the document. The device may identify the document class, associated with the document, based on a characteristic of the document. The document class may identify a category of document in which the document is included, and may be associated with multiple document types. The device may determine field information associated with the document class. The field information may include information that identifies a portion of the document where the specific information is located, or may include information that identifies a manner in which the specific information can be identified within the document. The device may analyze the document, based on the field information, in order to capture the specific information. The device may provide the captured specific information.

20 Claims, 8 Drawing Sheets

(56) References Cited

U.S. PATENT DOCUMENTS

| | | | |
|---|---|---|---|
| 5,159,667 A * | 10/1992 | Borrey | G06F 17/30011 |
| | | | 382/171 |
| 5,721,940 A * | 2/1998 | Luther | G06F 17/243 |
| | | | 715/200 |
| 7,149,347 B1 | 12/2006 | Wnek | |
| 8,094,976 B2 | 1/2012 | Berard et al. | |
| 2007/0168382 A1* | 7/2007 | Tillberg | G06F 17/30253 |
| 2013/0120595 A1 | 5/2013 | Roach et al. | |
| 2014/0029857 A1* | 1/2014 | Kompalli | G06K 9/00483 |
| | | | 382/212 |

OTHER PUBLICATIONS

EMC Corporation, "Captiva Intelligent Enterprise Capture," http://www.emc.com/enterprisecontentmanagement/captiva/captiva-iec.htm, Oct. 6, 2011, 2 pages.

Neevia Technology, "Document Converter Pro: Product Description," https://neevia.com/products/dcpro/, Jun. 26, 2014, 1 page.

Online OCR, "Free Online OCR Service," http://www.onlineocr.net/, May 12, 2014, 1 page.

Neevia Technology, "Products," https://neevia.com/products/, Apr. 20, 2010, 1 page.

OmniPage, "Don't Convert Documents, Transform Them!" http://www.nuance.com/for-business/by-product/omnipage/ultimate/index.htm, Apr. 29, 2013, 3 pages.

Extended European Search Report corresponding to EP Application No. 15 16 7331, dated Apr. 1, 2016, 6 pages.

\* cited by examiner

FIG. 5B

CAPTURING SPECIFIC INFORMATION BASED ON FIELD INFORMATION ASSOCIATED WITH A DOCUMENT CLASS

RELATED APPLICATION

This application claims priority under 35 U.S.C. § 119 to Indian Provisional Patent Application No. 5580/CHE/2014, filed on Nov. 5, 2014, the content of which is incorporated by reference herein in its entirety.

BACKGROUND

Optical character recognition (OCR) technology may allow text included in a document (e.g., a scanned paper document, a portable document format (PDF) file, an image file, etc.) to be recognized and/or converted into an editable and/or searchable form (e.g., a text document, a Microsoft Word document, a Microsoft Excel document, etc.).

SUMMARY

According to some possible implementations, a device may include one or more processors to: obtain a document from which specific information is to be captured, where the specific information to be captured may depend on a document class associated with the document, and where the document may be of a document type; analyze the document in order to determine a characteristic of the document; identify the document class, associated with the document, based on the characteristic of the document, where the document class may identify a category of document in which the document is included, and where the document class may be associated with multiple document types, where the multiple document types may include the document type; determine field information associated with the document class, where the field information may include information that identifies a portion of the document where the specific information is located, or where the field information may include information that identifies a manner in which the specific information can be identified within the document; analyze the document, based on the field information, in order to capture the specific information from the document; and provide the captured specific information.

According to some possible implementations, a computer-readable medium may store instructions including one or more instructions that, when executed by one or more processors, cause the one or more processors to: receive a document from which specific information is to be captured, where the specific information to be captured may correspond to a document class in which the document is included; process the document in order to determine one or more characteristics of the document; identify, based on the one or more characteristics, the document class in which the document is included; determine field information associated with the identified document class, where the field information may include information that identifies a location within the document at which the specific information is located, or where the field information may include information that identifies a manner in which the specific information can be found within the document; capture, based on the field information, the specific information from the document; and provide, for display, the captured specific information.

According to some possible implementations, a method may include: obtaining by a device, a document from which specific information is to be captured, where the specific information to be captured may depend on a document class associated with the document, and where the document may be of a document type; determining, by the device and based on a characteristic of the document, the document class of the document, where the document class may identify a category of document in which the document is included, and where the document class may be associated with multiple document types, where the document type may be included in the multiple document types; determining, by the device, field information associated with the document class, where the field information may identify a portion of the document where the specific information is located, or where the field information may identify a manner in which the specific information can be identified within the document; performing, by the device and based on the field information, optical character recognition (OCR) on the document; capturing, by the device and based on performing OCR, the specific information from the document; and providing, by the device, the captured specific information.

BRIEF DESCRIPTION OF THE DRAWINGS

FIGS. 5A-5C are diagrams of an example implementation relating to the example process shown in FIG. 4.

DETAILED DESCRIPTION

The following detailed description of example implementations refers to the accompanying drawings. The same reference numbers in different drawings may identify the same or similar elements.

A user may wish for specific information, included in an electronic document (herein referred to as a document), such as a portable document format (PDF) file, an image file, a text document, a Microsoft Word document, or the like, to be captured (e.g., by performing optical character recognition (OCR), by reading the document, etc.) based on a document class of the document. For example, the user may wish for first specific information (e.g., an order number, an order total, a customer identifier, etc.) to be captured from a document of a first document class (e.g., invoices), and may wish for second specific information (e.g., a date, an account number, a check amount, etc.) to be captured from a document of a second document class (e.g., checks).

Implementations described herein may provide a solution that allows for specific (e.g., user specified) information to be captured from a document based on identifying the document as being of a particular document class, and based on field information, associated with the document class, indicating the portion of the document at which the specific information may be located and/or a manner in which the specific information may be identified. Implementations described herein may also provide a solution that allows a user to review (e.g., accept, decline, edit, etc.) the captured specific information for the document. In some implementations, the field information, associated with the document class, may be updated (e.g., based on user input, by applying a machine learning technique, or the like) in order to improve performance associated with capturing similar specific information from another document of the document class (e.g., at a later time).

Figure 1A:
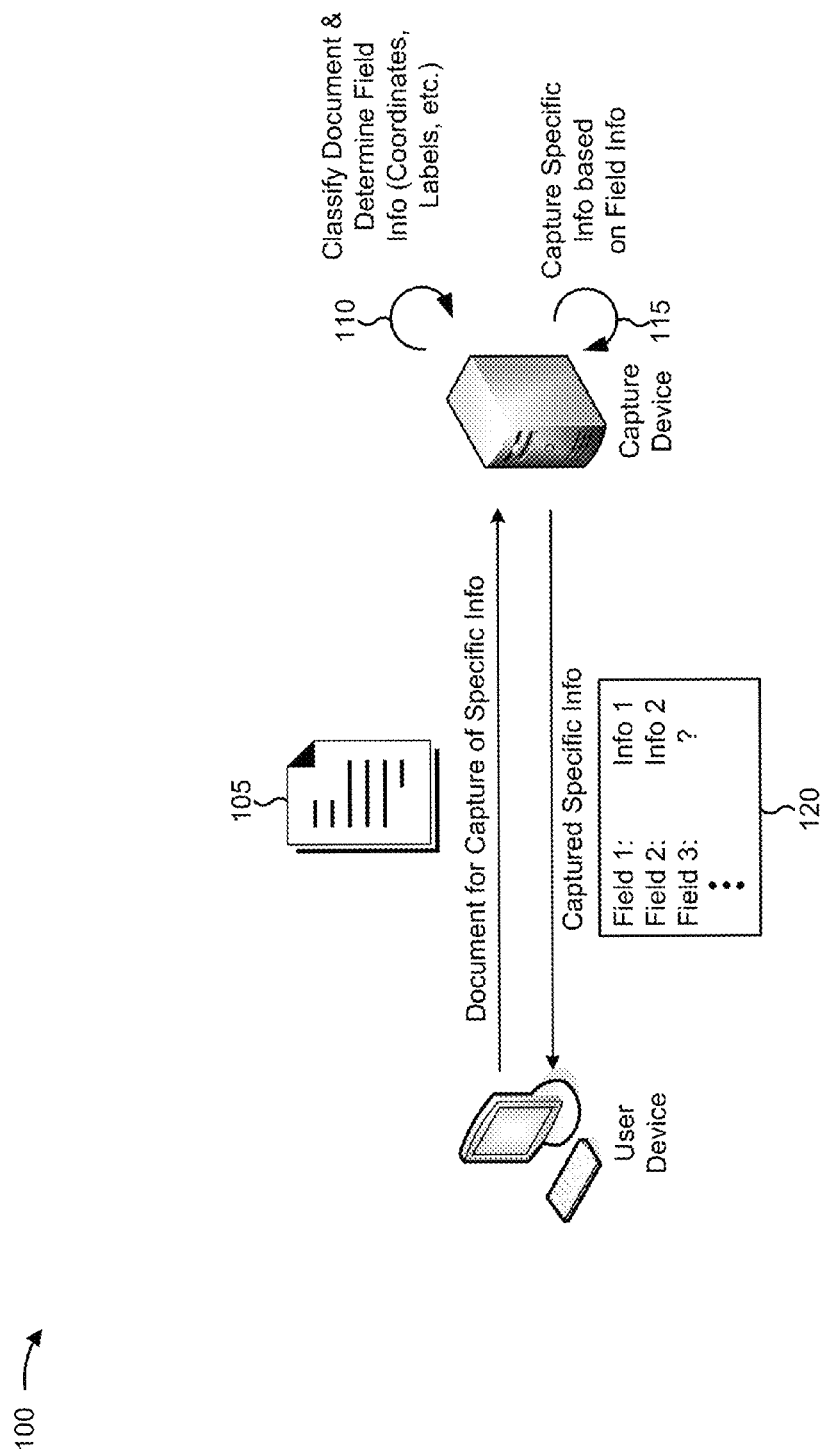
FIGS. 1A and 1B are diagrams of an overview of an example implementation described herein.
Figure 1B:
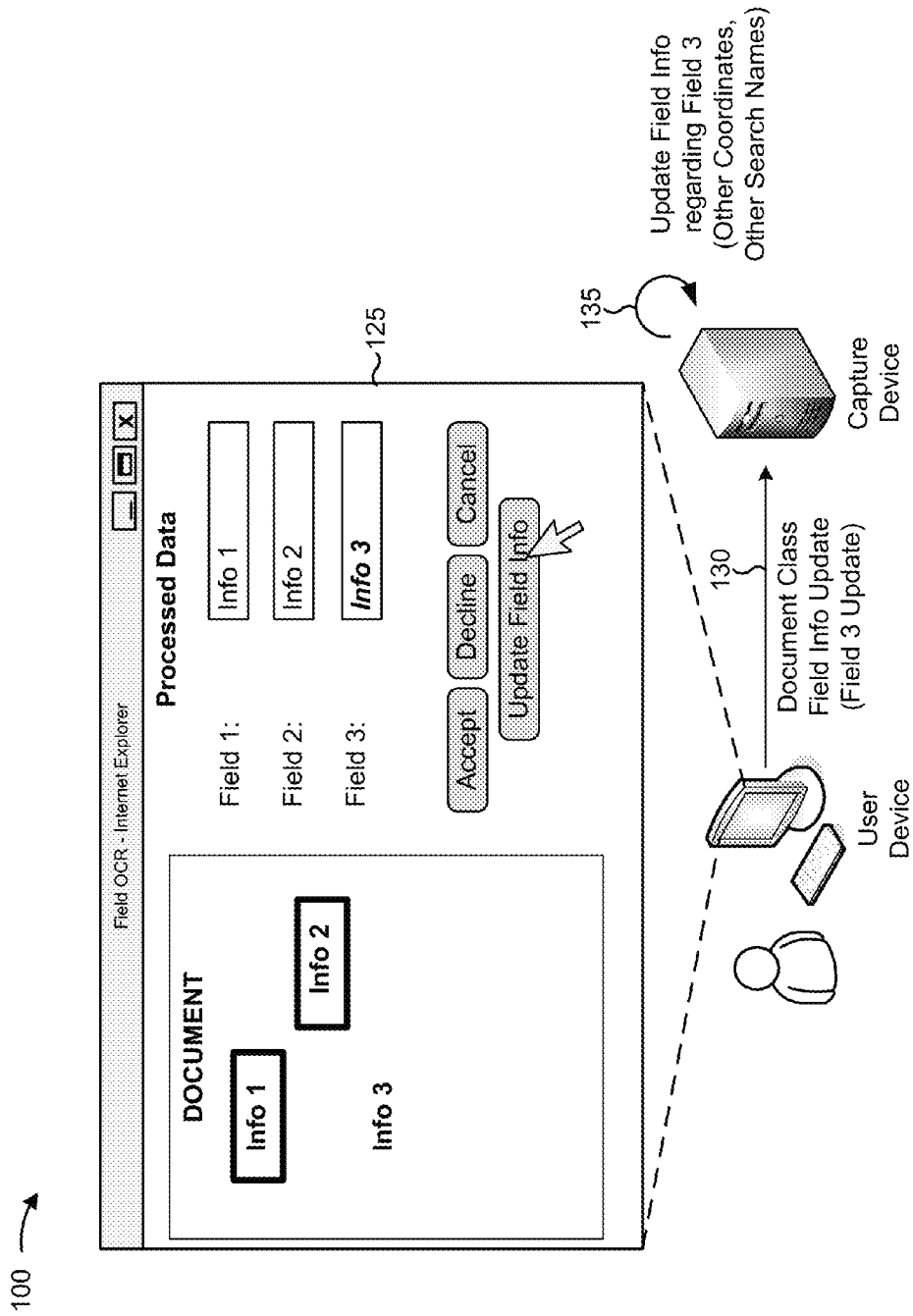

FIGS. 1A and 1B are diagrams of an overview of an example implementation 100 described herein. For the purposes of example implementation 100, assume that a user device stores or has access to a document (e.g., a PDF, an image file, a Microsoft Word document, etc.), and that the user device has received an indication (e.g., based on user input, based on a configuration of the user device, or the like) that the user device is to provide the document such that specific information may be captured from the document.

As shown in FIG. 1A, and by reference number 105, the user device may provide, to a capture device, the document for capture of specific information included in the document. As shown by reference number 110, the capture device may receive the document and may classify the document (e.g., based on performing OCR, inspecting the document, analyzing the document, reading the document, etc.), and may determine field information associated with the identified document class. Field information may include information that identifies a field of information that is to be captured (e.g., date, order number, customer number, order total, check number, account number, check amount, etc.) and information indicating where, within the document, the specific information for each field may be located and/or a manner in which the specific information may be identified. For example, the field information may include information identifying the location based on an x-y coordinate system (e.g., an x value and a y value corresponding to a point on an edge of a window, a height of the window, a width of the window, etc.), information identifying that the specific information may be found based on identifying (e.g., by performing OCR, by reading the document, etc.) a label within the document, or the like.

As shown by reference number 115, the capture device may capture the specific information (e.g., Field 1: Info 1, Field 2: Info 2, Field 3: ?) based on the field information. For the purposes of example implementation 100, assume that the capture device was unable to capture information for Field 3 (e.g., when the capture device was unable to capture any information based on the field information associated with Field 3). As shown by reference number 120, the capture device may provide the captured specific information to the user device.

As shown in FIG. 1B, and by reference number 125, the user device may receive the captured specific information, and may provide, for display to a user, the specific information via a user interface. As shown, a portion of the user interface may include a graphical representation of the document, that identifies locations from which the specific information was captured. As further shown, the user interface may also include the captured specific information. In this example, since the capture device was unable to capture information for Field 3 based on the field information, the user may edit (e.g., via a text box) the captured specific information to include the Field 3 information (e.g., Info 3). The user may Accept the captured specific information (e.g., such that the captured specific information is stored, sent to another device, exported to another document, etc.).

As further shown, the user may indicate (e.g., by selecting an Update Field Info button) that the user wishes to update the field information for the document class. Here, the user may input updated field information (e.g., based on an x-y coordinate system, based on a label, etc.) for Field 3 and, as shown by reference number 130, the user device may provide the field information update to the capture device. As shown by reference number 135, the capture device may receive the field information update, and may update the field information associated with the document class. In this way, the capture device may update the field information such that the capture device may be able to capture specific information for Field 3 for another document of the document class (e.g., at a later time). In some implementations, the capture device may automatically update the field information, for example, based on performing OCR on the document, inspecting the document, searching the document, or the like.

In this way, a capture device may capture specific information from a document based on identifying the document as being of a document class and based on field information associated with the document class. Moreover, the capture device may allow a user to review (e.g., accept, decline, edit, etc.) the captured specific information and/or update field information (e.g., based on user input, based on a machine learning technique) in order to improve performance associated with capturing similar specific information from another document of the document class (e.g., at a later time).

Figure 2:
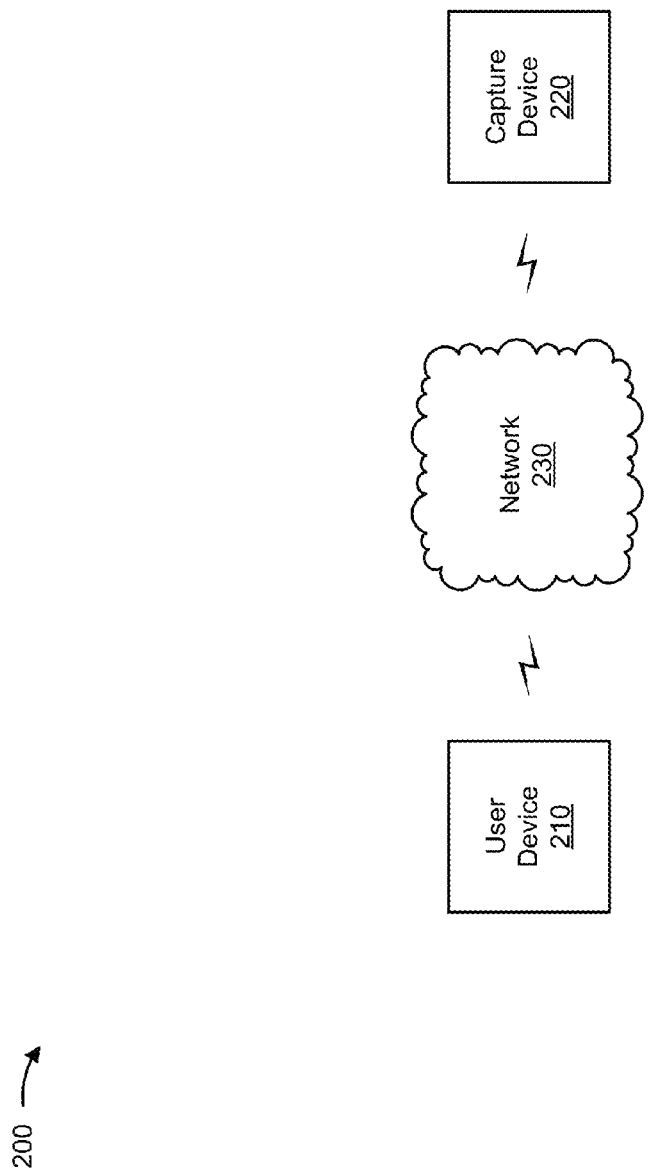
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a capture device 220, and a network 230. Devices of environment 200 may interconnect via wired connections, wireless connections, or a combination of wired and wireless connections.

User device 210 may include one or more devices capable of receiving, generating, storing, processing, and/or providing information associated with a document from which specific information is to be captured. For example, user device 210 may include a mobile phone (e.g., a smart phone, a radiotelephone, etc.), a laptop computer, a tablet computer, a handheld computer, a desktop computer, or a similar device. In some implementations, user device 210 may receive information from and/or transmit information to another device in environment 100, such as capture device 220.

Capture device 220 may include one or more devices capable of receiving, determining storing, processing, and/or providing captured specific information associated with a document. For example, capture device 220 may include a server device or a collection of server devices. In some implementations, capture device 220 may include a communication interface that allows capture device 220 to receive information from and/or transmit information to other devices in environment 100. In some implementations, capture device 220 may host and/or have access to an OCR application associated with performing OCR on a document (e.g., in order to capture specific information from the document). Additionally, or alternatively, capture device 220 may be capable of identifying a document class of a document, determining field information based on the document class, and/or capturing specific information based on the field information associated with the document class.

Network 230 may include one or more wired and/or wireless networks. For example, network 230 may include a cellular network (e.g., a long term evolution network, a third generation network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
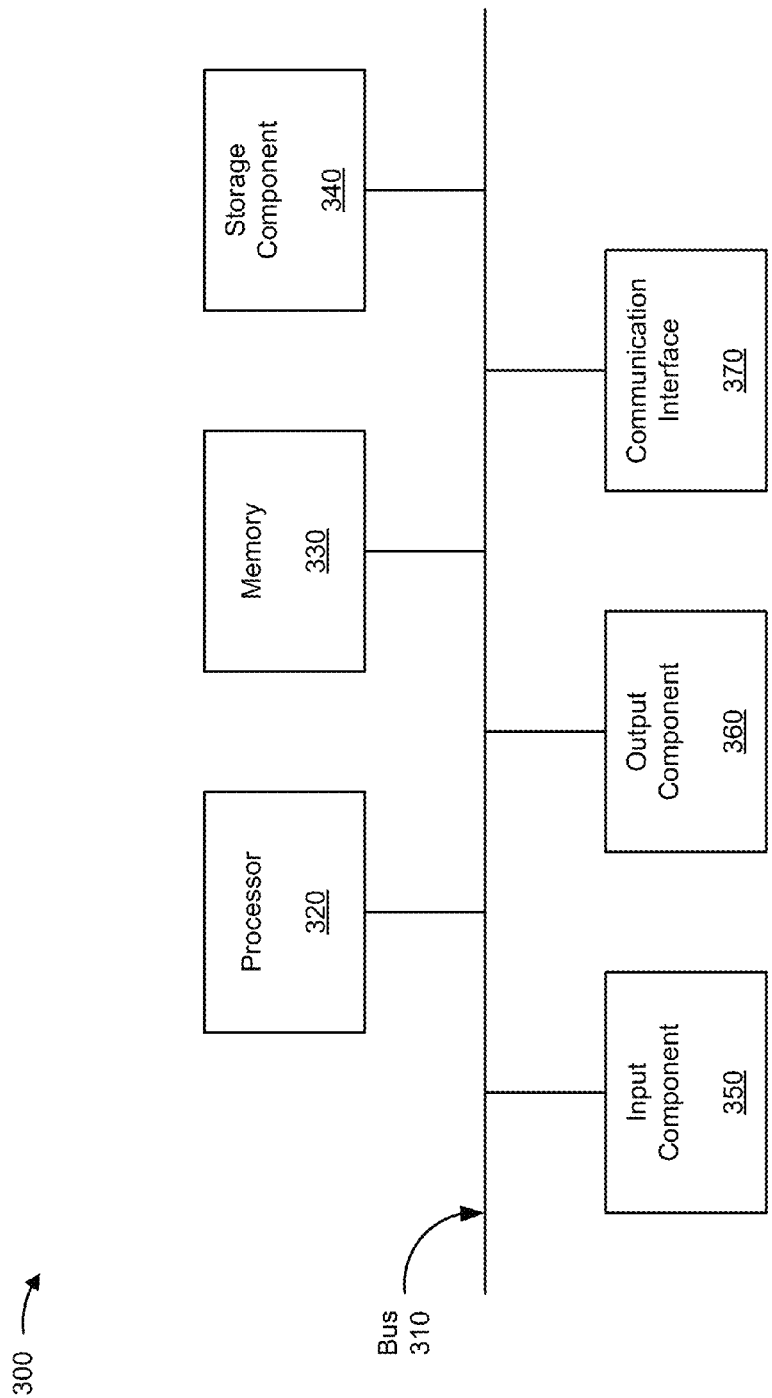
FIG. 3 is a diagram of example components of one or more devices of FIG. 2.

FIG. 3 is a diagram of example components of a device 300. Device 300 may correspond to user device 210 and/or capture device 220. In some implementations, user device 210 and/or capture device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
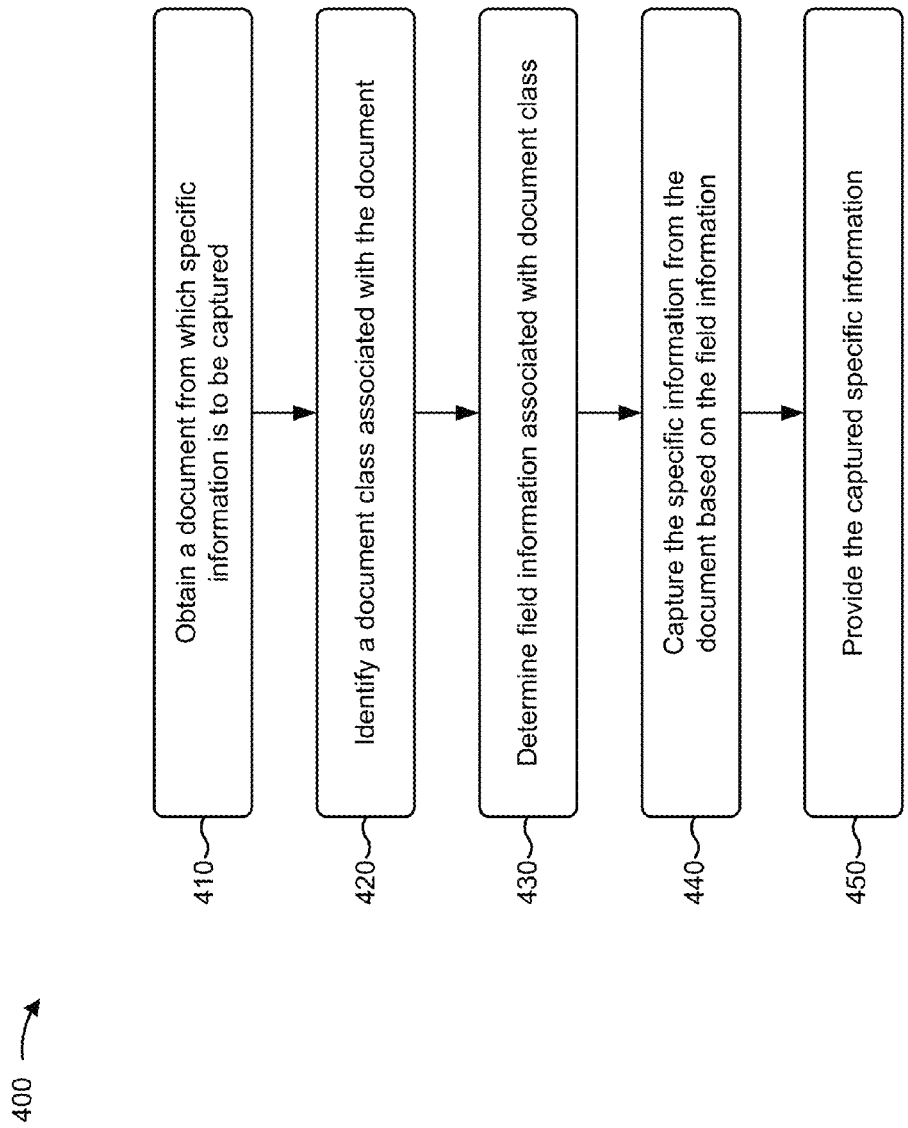
FIG. 4 is a flow chart of an example process for capturing specific information from a document based on field information associated with the document.

FIG. 4 is a flow chart of an example process 400 for capturing specific information from a document based on field information associated with the document. In some implementations, one or more process blocks of FIG. 4 may be performed by capture device 220. In some implementations, one or more process blocks of FIG. 4 may be performed by another device or a set of devices separate from or including capture device 220, such as user device 210.

As shown in FIG. 4, process 400 may include obtaining a document from which specific information is to be captured (block 410). For example, capture device 220 may obtain a document from which specific information is to be captured. In some implementations, capture device 220 may obtain the document based on another device (e.g., user device 210) providing the document. Additionally, or alternatively, capture device 220 may obtain the document based on requesting and/or retrieving the document from the other device. Additionally, or alternatively, capture device 220 may obtain the document based on information (e.g., provided by user device 210) identifying a storage location of the document, and capture device 220 may obtain the document from the identified storage location.

In some implementations, the document may include an electronic document from which specific information is to be captured, such as a PDF, a bitmap (BMP) file, a tagged image file (TIF), a portable network graphics (PNG) file, a joint photographic experts group (JPG) file, a text document (e.g., comma separated, with line breaks, etc.), a Microsoft Word document, an electronic publication (ePub) document, a Microsoft Excel document, a HyperText Markup Language (HTML) document (e.g., version 3.2, version 4.0, etc.), an InfoPath document, a Kindle document, a searchable PDF document, a Microsoft PowerPoint document, a Microsoft Publisher document, a Unicode text document (e.g., comma separated, formatted, with line breaks, etc.), a WordPad document, a searchable image document, or the like. In some implementations, the specific information may include information that is to be captured from the document, and may be based on a document class of the document, such as an invoice, an order, a check, a vendor statement, or the like.

In some implementations, capture device 220 may obtain multiple documents. For example, capture device 220 may obtain multiple documents of different document classes and/or of different document classes. As another example, capture device 220 may obtain a batch file (e.g., a single file that includes the document, such as an archive file, a compressed file, etc.) that includes the multiple documents. In some implementations, user device 210 may create the batch file that includes the document. For example, user device 210 may allow a user to provide, via a user interface, input that identifies the multiple documents to be provided for information capture, and user device 210 may create the batch file based on the user input. Here, user device 210 may provide the batch file to capture device 220 and/or to a shared memory storage location accessible by user device 210 and/or capture device 220.

In some implementations, capture device 220 may obtain the document from user device 210. For example, user device 210 may provide (e.g., based on an indication from the user) the document to capture device 220. As another example, user device 210 may create the batch file that includes the document, as described above, and may provide (e.g., via an Internet-based application) the batch file to capture device 220. As another example, user device 210 may automatically provide the document based on a configuration of user device 210 (e.g., when user device 210 is configured to automatically provide the document to capture device 210 when the document is received by a particular email account, when user device 210 is configured to provide documents at particular intervals of time, etc.).

Additionally, or alternatively, capture device 220 may obtain the document from a shared memory storage location accessible by capture device 220. For example, user device 210 may store the document in a memory location (e.g., a SharePoint document library, a secure file transfer protocol folder, etc.) accessible by both user device 210 and capture device 220. Here, capture device 220 may obtain the document from the shared memory location. In some implementations, this process may be referred to as offline processing. Configuring capture device 220 to obtain the document in this way may allow for improved performance. For example, allowing user device 210 to provide, to capture device 220, a set of documents that exceeds a particular size (e.g., 5 megabytes, 10 megabytes, 1 gigabyte, etc.) may result in inefficient use of computing resources (e.g., when the document is uploaded to capture device 220 and a converted set of documents is stored by the capture device 220, etc.). Offline processing may allow user device 210 to store the document in the shared memory storage location, and capture device 220 may obtain the document from the shared memory storage location, generate a captured specific information, and store the captured specific information in the shared memory storage location.

As further shown in FIG. 4, process 400 may include identifying a document class associated with the document (block 420). For example, capture device 220 may identify a document class associated with the document. In some implementations, capture device 220 may identify the document class, associated with the document, after capture device 220 obtains the document. Additionally, or alternatively, capture device 220 may identify the document class, associated with the document, when capture device 220 receives an indication that capture device 220 is to identify the document class.

A document class may include information that identifies a category of the document from which the specific information is to be captured. For example, the document class may identify a category of document associated with a business operation, such as an invoice, a purchase order, a vendor statement, a check, a healthcare document, a human resources document, an insurance document, or the like. In some implementations, the specific information that is to be captured from the document may depend on the document class. For example, first specific information (e.g., an order number, an order total, a customer identifier, etc.) may be captured from documents of a first document class (e.g., invoices), while second specific information (e.g., a date, an account number, a check amount, etc.) may be captured from a document of a second document class (e.g., checks). In some implementations, different types of documents may be included in the document class. For example, the document class (e.g., invoices) may include documents of one or more types (e.g., PDFs, Microsoft Word, etc.).

In some implementations, capture device 220 may store or have access to information associated with a document class that may allow capture device 220 to identify the document class of the document. For example, in some implementations, capture device 220 may store or have access to information, associated with a document class, that includes information indicating that documents included in the document class include a particular string of characters (e.g., at any location in the document, at a particular location in the document, such as a portion of a page of the document, a page of the document, a range of pages of the document, a location identified based on an x-y coordinate system, etc.), a particular word (e.g., at any location in the document, at a particular location in the document, such as a portion of a page of the document, a page of the document, a range of pages of the document, a location identified based on an x-y coordinate system, etc.), a particular phrase (e.g., at any location in the document, at a particular location in the document, such as a portion of a page of the document, a page of the document, a range of pages of the document, a location identified based on an x-y coordinate system, etc.), or the like.

Additionally, or alternatively, the information associated with the document class may include information indicating that documents of the document class are laid out in a particular manner. For example, the information associated with the document class may indicate that documents of the document class include a table at a first location in the document (e.g., a portion of a page, a page, a range of pages, a location based on an x-y coordinate system, etc.), a numeric value at a second location of the document, a line of text at a third location of the document, or the like.

Additionally, or alternatively, the information associated with the document class may include information indicating that documents of the document class may have a particular filename, particular filename structure, and/or may be a particular format. For example, the information associated with an invoice document class may indicate that documents of the invoice document class may include a particular word in the filename (e.g., "inv," "invoice," etc.), may be structured in a particular way (e.g., a string of four letters followed by a string of six numbers), and/or may be a TIF document.

Additionally, or alternatively, the information associated with the document class may include information indicating that documents of the document class may be obtained from a particular source. For example, the information associated with the document class may indicate that documents included in the document class may be received from a particular user device 210, obtained from a particular email account (e.g., invoice@company.com, admin@company.com, etc.), obtained from a particular storage location (e.g., from a particular file folder, or the like. Additionally, or alternatively, the information associated with the document class may include another type of information that may allow capture device 220 to identify a document as being included in the document class. In some implementations, capture device 220 may store or have access to information associated with multiple document classes, and capture device 220 may analyze the document in order to identify a document class, of the multiple document classes, in which the document is included.

In some implementations, capture device 220 may receive the information associated with the document class based on user input. For example, a user may provide, via user device 210, information that identifies the document class and the information associated with the document class.

Additionally, or alternatively, capture device 220 may receive the information associated with the document class based on inspecting a document with a known document class. For example, capture device 220 may receive a document and information identifying a document class of the document, and may process (e.g., perform OCR, read, inspect, etc.) the document in order to identify characteristics of the document (e.g., a word, a phrase, a location of the word, a location of the phrase, a layout, a filename, a filename structure, a file format, a source, etc.). Capture device 220 may then store information indicating documents of the document class may include similar characteristics. In some implementations, capture device 220 may perform a similar process for multiple documents of the document class in order to update information associated with the document class. Additionally, or alternatively, capture device 220 may perform a similar process for multiple document classes. In this way, capture device 220 may store or have access to information associated with multiple document classes (e.g., and capture device 220 may use the information, associated with the multiple document classes, to identify the document class of the document).

In some implementations, capture device 220 may identify the document class, associated with the document, based on processing the document. For example, capture device 220 may process the document and determine that the document includes a particular phrase (e.g., "vendor statement") and was received from a particular source (e.g., a particular user device 210). Here, capture device 220 may compare the determined information to information associated with multiple document classes, and may determine, based on the comparison, that the document is a vendor statement. In some implementations, capture device 220 may identify multiple document classes, and may select (e.g., based on user input, based on which document class is a closest match, etc.) a particular document class of the multiple document classes.

As further shown in FIG. 4, process 400 may include determining field information associated with the document class (block 430). For example, capture device 220 may determine field information associated with the document class. In some implementations, capture device 220 may determine the field information after capture device 220 identifies the document class associated with the document. Additionally, or alternatively, capture device 220 may determine the field information when capture device 220 receives an indication that capture device 220 is to determine the field information.

Field information may include information that identifies a field of information that is to be captured (e.g., date, order number, customer number, order total, check number, account number, check amount, etc.) and information indicating where, within the document (e.g., of the document class), the specific information for each field may be located and/or a manner in which the specific information for each field may be identified. For example, the field information may include information identifying a location within a document of the document class (e.g., a portion of a page, a page, a range of pages, a location based on an x-y coordinate system, etc.) at which the specific information for the field may be located. As another example, the field information may include information identifying a manner in which the specific information for the field may be identified (e.g., to the right of a particular word, below a particular phrase, etc.).

In some implementations, capture device 220 may determine the field information based on information provided by user device 210. For example, a user may provide, via user device 210, the field information for the document class (e.g., a field of information that is to be captured, a location at which the specific information for the field may be located, etc.). Here, user device 210 may provide the field information to capture device 220. In some implementations, the user may provide field information for multiple document classes (e.g., such that capture device 220 stores or has access to field information associated with the multiple document classes). Additionally, or alternatively, capture device 220 may determine the field information based on a field information update (e.g., provided by the user, determined by capture device 220, etc.), as described below.

Additionally, or alternatively, capture device 220 may determine the field information, associated with the document class, based on inspecting a document with known field information. For example, capture device 220 may receive a document of the document class and known field information associated with the document. Here, capture device 220 may process (e.g., perform OCR, read, inspect, etc.) the document in order to identify characteristics of the document in relation to the field information. Capture device 220 may then store information indicating field information for documents of the document class may identified in a similar manner. In some implementations, capture device 220 may perform a similar process for multiple documents of the document class in order to update field information associated with the document class. Additionally, or alternatively, capture device 220 may perform a similar process for multiple document classes. In this way, capture device 220 may store or have access to field information associated with multiple document classes.

As further shown in FIG. 4, process 400 may include capturing the specific information from the document based on the field information (block 440). For example, capture device 220 may capture the specific information from the document based on the field information. In some implementations, capture device 220 may capture the specific information after capture device 220 determines the field information associated with the document class. Additionally, or alternatively, capture device 220 may capture the specific information when capture device 220 receives an indication that capture device 220 is to capture the specific information.

In some implementations, capture device 220 may capture the specific information by performing OCR on the document. For example, capture device 220 may store or access an OCR application that allows capture device 220 to recognize and capture information from the document (e.g., when the document is not in a readable format, such as a TIF, a PDF, a BMP, etc.). Additionally, or alternatively, capture device 220 may capture the specific information by reading the document. For example, capture device 220 may read and capture information from the document (e.g., when the document is in a readable format a Microsoft Word document, a Microsoft Excel document, etc.).

In some implementations, capture device 220 may capture the specific information based on the field information. For example, capture device 220 may capture the specific information based performing OCR at a location identified by the field information. As another example, capture device 220 may capture the specific information by reading the document at a location identified by the field information. In some implementations, capture device 220 may capture the specific information based on the field information such that performance (e.g., in terms of time to capture, use of computing resources, etc.) is improved (e.g., since capture device 220 may not need to perform OCR on the entire document, since capture device 220 may need to read only a portion of the document, etc.)

In some implementations, capture device 220 may be unable to capture the specific information based on the field information. For example, capture device 220 may perform OCR at a location, identified by the field information, but the location may not include the specific information (e.g., when capture device 220 performs OCR on a blank area, when capture device 220 reads from a location with no text, etc.). In some implementations, capture device 220 may provide information indicating that capture device 220 was unable to capture the specific information, as described below.

As further shown in FIG. 4, process 400 may include providing the captured specific information (block 450). For example, capture device 220 may provide the captured specific information. In some implementations, capture device 220 may provide the captured specific information after capture device 220 captures the specific information. Additionally, or alternatively, capture device 220 may provide the captured specific information when capture device 220 receives an indication that capture device 220 is to provide the captured specific information.

In some implementations, capture device 220 may provide the captured specific information to user device 210 (e.g., such that the user may view and/or access the captured specific information). Additionally, or alternatively, capture device 220 may store the captured specific information, and may provide the captured specific information at a later time (e.g., based on a request provided by user device 210). In some implementations, capture device 220 may store the captured specific information for a period of time (e.g., a week, 30 days, etc.), after which the captured specific information may be deleted (e.g., if user device 210 has not retrieved the captured specific information when the period of time expires). Additionally, or alternatively, capture device 220 may delete the captured specific information after providing the captured specific information (e.g., to user device 210, to a shared memory storage location, etc.).

In some implementations, user device 210 may receive the captured specific information and may provide, for display to a user, a user interface associated with validating the captured specific information. In some implementations, the validation user interface may be associated with a web application accessible by user device 210. For example, user device 210 may have access to a web application (e.g., hosted by and/or associated with capture device 220) associated with uploading the document from which the specific information is to be captured, capturing the specific information, and providing the specific information for validation by the user. Here, user device 210 may provide, for display to the user, the validation user interface via the web application.

In some implementations, the validation user interface may provide allow the user to input and/or view status information associated with the captured specific information (e.g., captured, accepted, declined, error, etc.). In some implementations, the user may view the captured specific information, accept the captured specific information (e.g., with or without including a comment), decline the captured specific information (e.g., with or without including decline reasoning information), edit the captured specific information, view information associated with an error experienced while capturing the specific information, cause the captured specific information to be transferred for storage (e.g., in a particular format, such as extensible markup language format, for future use), or the like.

Additionally, or alternatively, the validation user interface may allow the user to update field information associated with the document class. For example, if capture device 220 incorrectly and/or is unable to capture specific information for a particular field, then user device 210 may provide, via the validation user interface, a field information update associated with the particular field (e.g., a revised location, a new location, a new word, etc.). Here, user device 210 may provide the field information update to capture device 220, and capture device 220 may update the field information, associated with the document class, accordingly (e.g., such that capture device 220 may correctly capture the specific information for the field in another document at a later time).

In some implementations, capture device 220 may automatically (e.g., without user intervention) perform validation for the captured specific information. For example, assume that capture device 220 stores or has access to information indicating that specific information for a date field is to be in a particular format (e.g., a numerical format, such as 01-20-14). Here, if capture device 220 captures specific information for the date field as "June 10, 2014", then capture device 210 may automatically invalidate the captured specific information (e.g., since the date is not the proper format). Similarly, if capture device 220 captures specific information for the date field as "11-10-14", then capture device 210 may automatically validate the captured specific information (e.g., since the date is in the proper format). In some implementations, capture device 220 may provide (e.g., to user device 210) an indication associated with automatically performing validation of the captured specific information (e.g., a notification that a date is in an improper format, a notification that the date is in the proper format, etc.).

In some implementations, capture device 220 may also provide, to user device 210, reporting information associated with specific information captured by capture device 220. For example, capture device 220 may provide reporting information that identifies a quantity of for which specific information was captured and/or stored during a period of time (e.g., a particular day, a particular week, a particular year, etc.), a quantity of documents processed by capture device 220 during the particular period of time, a quantity of capturing errors experienced during the particular period of time, an average length of time for validation of captured specific information during the particular period of time, or another type of information.

In some implementations, after the captured specific information is provided, edited, validated, or the like, the captured specific information may be provided (e.g., by capture device 220) to another device associated with a workflow that uses the captured specific information. For example, in a workflow associated with paying a third party based on an invoice, captured specific information (e.g., information that identifies a cost that is to be paid to the third party) may be provided such that a document (e.g., an invoice that identifies the cost and that identifies the third party) is accepted for a next step in a workflow (e.g., associated with making a payment to the third party). In some implementations, capture device 220 may provide the captured specific information for a first document, and may repeat example process 400 for another document (e.g., such that capture device 220) captures specific information for multiple documents.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
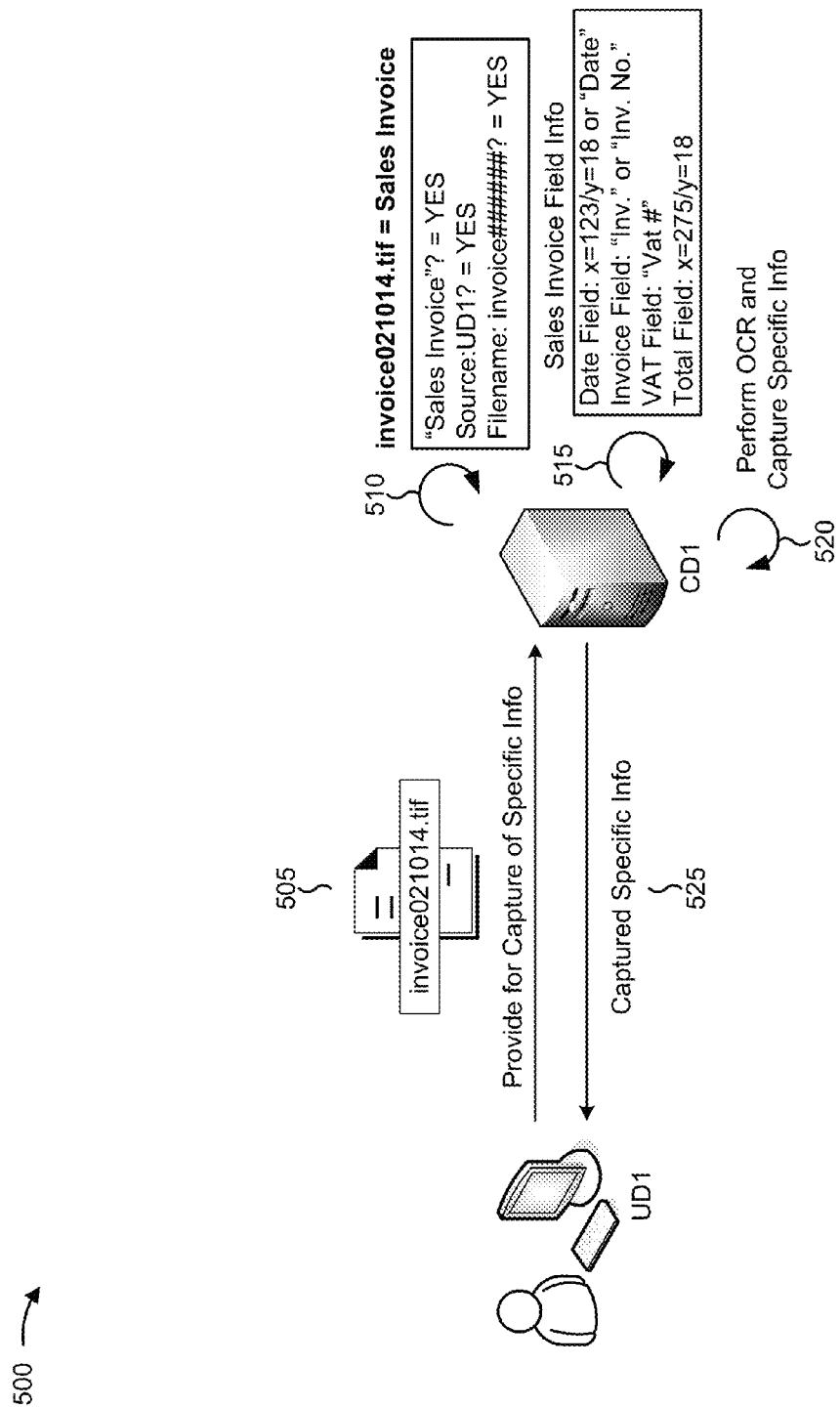
Figure 5B:
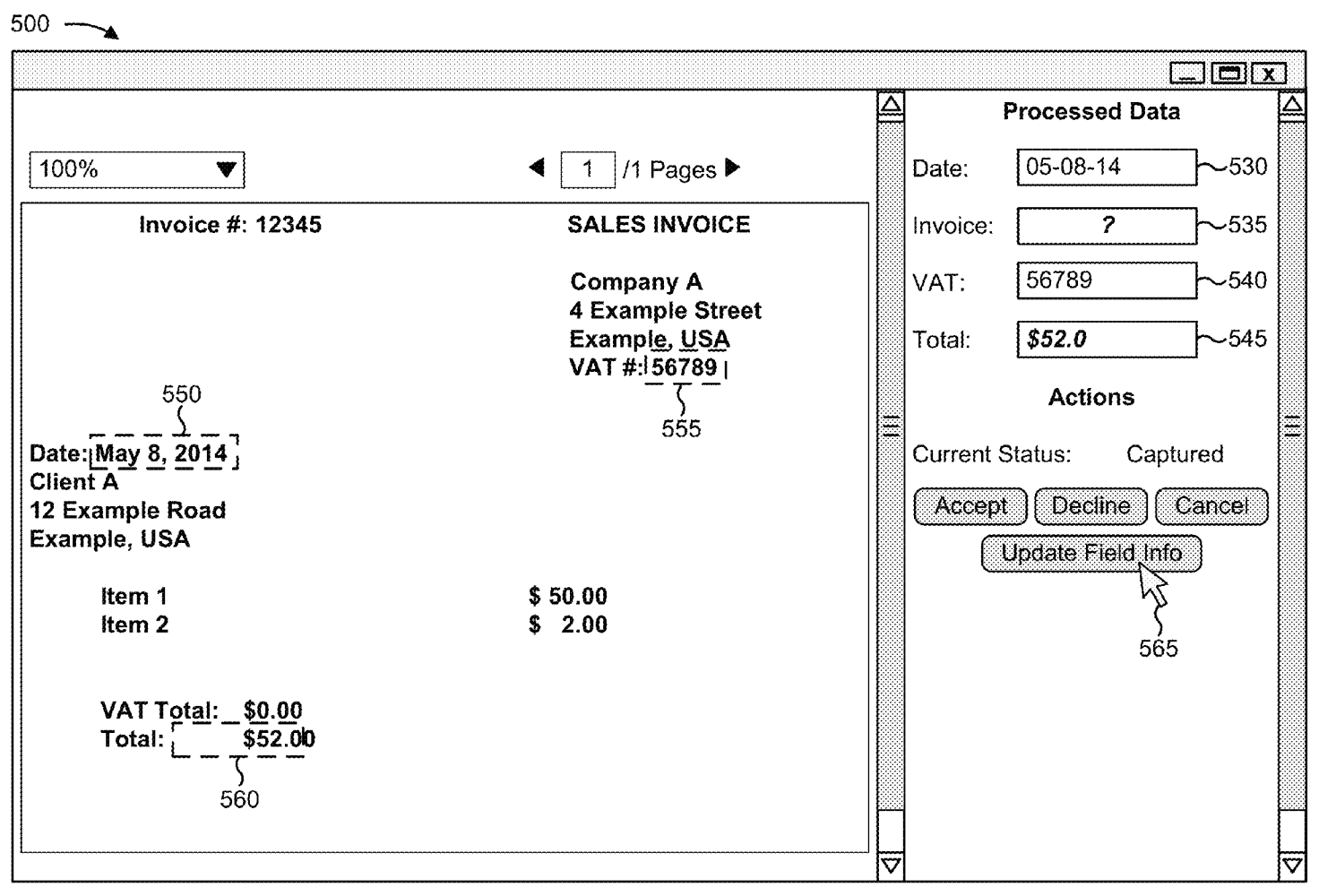
Figure 5C:
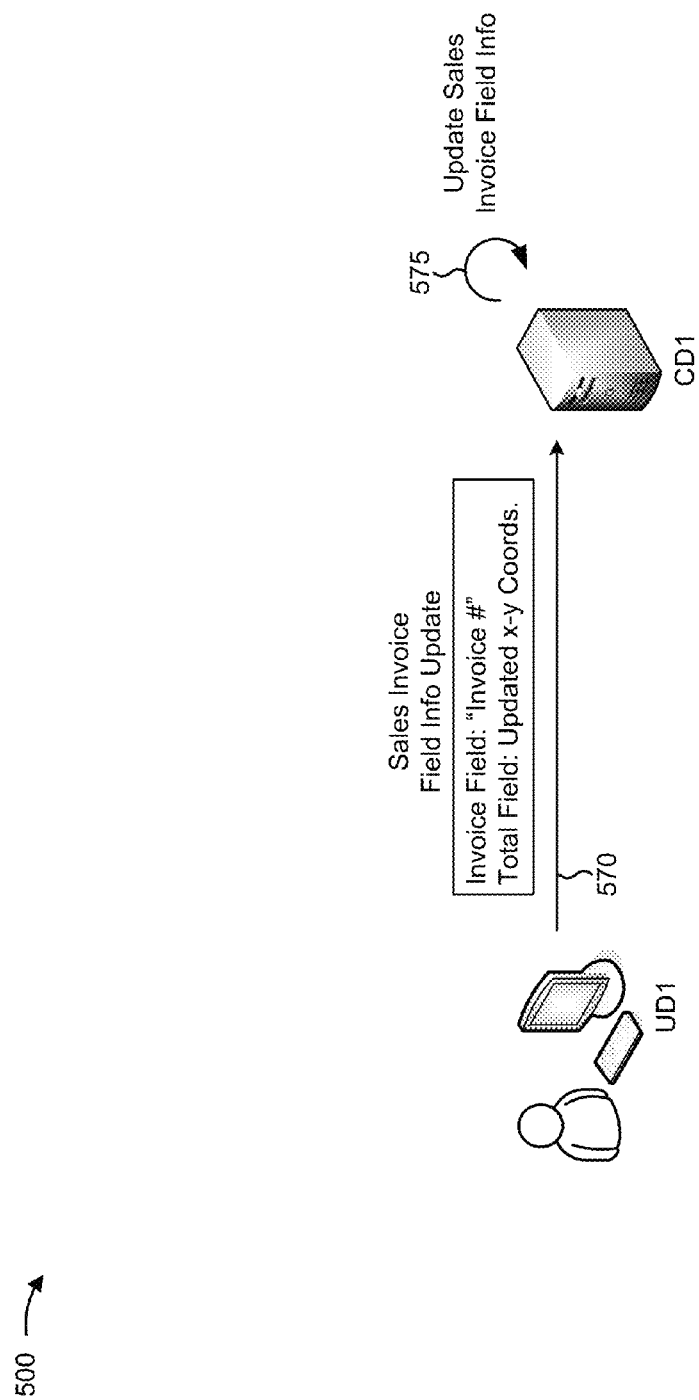

FIGS. 5A-5C are diagrams of an example implementation 500 relating to example process 400 shown in FIG. 4. For the purposes of example implementation 500, assume that user device 210 (e.g., UD1) has received a document (e.g., invoice021014.tif), and that UD1, upon receiving the document, is configured to automatically (e.g., without user intervention) provide the document to capture device 220 (e.g., CD1) for capturing of specific information included in the document.

As shown in FIG. 5A, and by reference number 505, UD1 may provide the document to CD1 for capturing of specific information. As shown by reference number 510, CD1 may receive the document and may process the document in order to identify a document class associated with the document. For the purposes of example implementation 500, assume that CD1 stores information, associated with a sales invoice document class, indicating that a sales invoice document may include a particular phrase (e.g., "sales invoice"), may be provided by a particular source (e.g., UD1), and/or may have a particular filename structure (e.g., invoice######). As shown, CD1 may determine that the document includes "sales invoice", was provided by UD1, and that the filename of the document is in the invoice####### structured. As such, CD1 may identify the document class of the document as sales invoice.

As shown by reference number 515, CD1 may determine field information, associated with the sales invoice document class, that identifies a set of fields for which specific information is to be captured, and information indicating a manner in which the specific information for each field may be identified (e.g., Date Field: x=123/y=18 or "Date", Invoice Field: "Inv." or "Inv. No.", VAT Field: "VAT #), Total Field: x=275/y=18).

As shown by reference number 520, CD1 may perform OCR based on the field information in order to capture the specific information for each field. For example, CD1 may perform OCR in order to capture specific information for the date field (e.g., by performing OCR from left to right starting at the date field x-y coordinate in a window of a default width and a default height and/or by searching for the date field word and performing OCR to the right of the date field word within a default window), specific information for the invoice field (e.g., by searching for the invoice field word and performing OCR to the right of the invoice field word within a default window, or searching for the invoice field phrase and performing OCR to the right of the invoice field phrase within a default window), specific information for the VAT field (e.g., by searching for the VAT field word and performing OCR to the right of the VAT field word within a default window), and specific information for the total field (e.g., by performing OCR from left to right starting at the total field x-y coordinate and in a window of the default width and the default height). As shown by reference number 525, CD1 may provide the captured specific information to UD1.

FIG. 5B shows a diagram of an example validation user interface associated with the capture specific information. As shown by reference numbers 530, 535, 540, and 545, the validation user interface (e.g., associated with a web application accessible by UD1) may include the captured specific information for the date field, the invoice field, the VAT field, and the total field, respectively. For the purposes of example implementation 500, assume that CD1 was unable to capture specific information for the invoice field (e.g., CD1 was unable to locate "Inv." or "Inv. No." when performing OCR on the document). As shown by reference numbers 550, 555, and 560, the validation user interface may include information (e.g., using boxes with dashed lines) identifying locations from which CD1 captured the specific information for the date field, the VAT field, and the total field, respectively. As shown, the specific information for the total field may be inaccurate (e.g., since CD1 did not capture the last zero of total). The user may edit the captured specific information as necessary (e.g., by typing in the invoice number, and by completing the total), and may Accept (e.g., by selecting an Accept button) the captured specific information (e.g., such that the captured specific information is stored, exported, etc.).

As shown by reference number 565, the user may also indicate (e.g., by selecting an Update Field Info button that the user wishes to update the field information associated with the sales invoice document class. For the purposes of example implementation 500, assume that the user provides (e.g., via a field information update user interface) a field information update indicating that specific information for the invoice field in a sales invoice may be captured by searching for an additional phrase (e.g., "Invoice #") and information that identifies updated set of x-y coordinates associated with capturing specific information for the total field in a sales invoice.

As shown in FIG. 5C, and by reference number 570, UD1 may provide the updated sales invoice field information to CD1. As shown by reference number 575, CD1 may update the field information associated with the sales invoice document class (e.g., such that CD1 may, at a later time, capture specific information for another sales invoice document based on the updated field information).

As indicated above, FIGS. 5A-5C are provided merely as an example. Other examples are possible and may differ from what was described with regard to FIGS. 5A-5C.

Implementations described herein may provide a solution that allows for specific information to be captured from a document based on identifying the document as being of a particular document class, and based on field information, associated with the document class, indicating the portion of the document at which the specific information may be located and/or a manner in which the specific information may be identified. Implementations described herein may also provide a solution that allows a user to review (e.g., accept, decline, edit, etc.) the captured specific information for document. In some implementations, the field information, associated with the document class, may be updated (e.g., based on user input, by applying a machine learning technique) in order to improve performance associated with capturing similar specific information from another document of the document class (e.g., at a later time).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   obtain a document from which specific information is to be captured,
   the specific information to be captured depending on a document class associated with the document, and
   the document being of a document type;
   analyze the document in order to determine a characteristic of the document;
   identify the document class, associated with the document, based on the characteristic of the document,
   the document class identifying a category of document in which the document is included, and
   the document class being associated with multiple document types, the multiple document types including the document type;
   determine field information associated with the document class,
   the field information including information that identifies a portion of the document where the specific information is located, or
   the field information including information that identifies a manner in which the specific information can be identified within the document;
   analyze the document, based on the field information, in order to capture the specific information from the document;
   provide the captured specific information;
   receive, based on the captured specific information being provided, a field information update for the field information associated with the document class,
   the field information update indicating a revised location of where the specific information is located in the document of the document type; and
   update the field information for the document class associated with the multiple document types based on the field information update indicating the revised location of where the specific information is located in the document of the document type.

2. The device of claim 1, where the one or more processors are to:
   determine a set of characteristics associated with the document class,
   the set of characteristics including one or more characteristics that, if included in the document, indicate that the document is included in the document class; and
   where the one or more processors, when identifying the document class, are to:
   identify the document class based on determining that the characteristic of the document is included in the set of characteristics associated with the document class.

3. The device of claim 1, where the information that identifies the portion of the document where the specific information is located includes at least one of:
   a particular location based on a coordinate system;
   a particular portion of a page included in the document;
   a particular page included in the document; or
   a particular range of pages included in the document.

4. The device of claim 1, where the one or more processors, when analyzing the document in order to capture the specific information, are to:
perform optical character recognition (OCR) on the document in order to capture the specific information,
the OCR being performed in accordance with the field information.

5. The device of claim 1, where the one or more processors, when determining the field information, are to:
determine the field information based on user input.

6. The device of claim 1, where the one or more processors, when providing the captured specific information, are to:
provide the captured specific information for display via a validation user interface,
the validation user interface allowing a user to review the captured specific information.

7. A non-transitory computer-readable medium storing instructions, the instructions comprising:
one or more instructions that, when executed by one or more processors, cause the one or more processors to:
receive a document from which specific information is to be captured,
the specific information to be captured corresponding to a document class in which the document is included,
the document being of a document type and the document class being associated with multiple document types,
the multiple document types including the document type;
process the document in order to determine one or more characteristics of the document;
identify, based on the one or more characteristics, the document class in which the document is included;
determine field information associated with the identified document class,
the field information including information that identifies a location within the document at which the specific information is located, or
the field information including information that identifies a manner in which the specific information can be found within the document;
capture, based on the field information, the specific information from the document;
provide, for display, the captured specific information;
receive, based on the captured specific information being provided for display, a field information update for the field information associated with the document class,
the field information update indicating a revised location of where the specific information is located in the document of the document type; and
update the field information for the document class associated with the multiple document types based on the field information update indicating the revised location of where the specific information is located in the document of the document type.

8. The computer-readable medium of claim 7, where the one or more instructions, when executed by the one or more processors, further cause the one or more processors to:
determine characteristics associated with the document class,
the characteristics including characteristics that, if included in the document, indicate that the document is included in the document class; and
where the one or more instructions, that cause the one or more processors to identify the document class in which the document is included, cause the one or more processors to:
identify the document class based on determining that the one or more characteristics of the document are included in the characteristics associated with the document class.

9. The computer-readable medium of claim 7, where the one or more instructions, that cause the one or more processors to capture the specific information, cause the one or more processors to:
read the document in order to capture the specific information,
the document being read in accordance with the field information.

10. The computer-readable medium of claim 7, where the one or more instructions, that cause the one or more processors to receive the document from which specific information is to be captured, cause the one or more processors to:
receive the document without user intervention.

11. The computer-readable medium of claim 7, where the one or more instructions, that cause the one or more processors to provide, for display, the captured specific information, cause the one or more processors to:
provide the captured specific information for display via a validation user interface, the validation user interface allowing a user to accept, decline, or edit the captured specific information.

12. A method, comprising:
obtaining by a device, a document from which specific information is to be captured,
the specific information to be captured depending on a document class associated with the document, and
the document being of a document type;
determining, by the device and based on a characteristic of the document, the document class of the document,
the document class identifying a category of document in which the document is included, and
the document class being associated with multiple document types,
the document type being included in the multiple document types;
determining, by the device, field information associated with the document class,
the field information identifying a portion of the document where the specific information is located, or
the field information identifying a manner in which the specific information can be identified within the document;
performing, by the device and based on the field information, optical character recognition (OCR) on the document;
capturing, by the device and based on performing OCR, the specific information from the document;
providing, by the device, the captured specific information;
receiving, by the device and based on the captured specific information being provided, a field information update for the field information associated with the document class,
the field information update indicating a revised location of where the specific information is located in the document of the document type; and
updating, by the device, the field information for the document class associated with the multiple document types based on the field information update indicating the revised location of where the specific information is located in the document of the document type.

13. The method of claim 12, further comprising:
determining a set of characteristics associated with the document class,
the set of characteristics including one or more characteristics that, if included in the document, indicate that the document is included in the document class; and
where determining the document class of the document comprises:
determining the document class based on identifying that that the characteristic of the document is included in the set of characteristics associated with the document class.

14. The method of claim 12, where the field information that identifies the portion of the document where the specific information is located includes at least one of:
a location based on a coordinate system;
a portion of a page included in the document;
a page included in the document; or
a range of pages included in the document.

15. The method of claim 12, where the field information that identifies the manner in which the specific information can be identified includes:
a string of characters associated with the specific information;
a word associated with the specific information; or
a phrase associated with the specific information.

16. The method of claim 12, where providing the captured specific information comprises:
providing the captured specific information for display via a validation user interface,
the validation user interface allowing a user to review the captured specific information.

17. The device of claim 1, where the one or more processors, when obtaining the document from which specific information is to be captured, are to:
utilize information identifying a storage location of the document; and
obtain the document from the storage location.

18. The computer-readable medium of claim 7, where the one or more instructions, that cause the one or more processors to receive the document from which specific information is to be captured, cause the one or more processors to:
receive the document from a particular user device;
receive the document from a particular email account; or
receive the document from a particular storage location.

19. The method of claim 12, where the characteristic of the document that determines the document class of the document includes:
a particular filename;
a particular filename structure; or
a particular filename format.

20. The device of claim 1, where the one or more processors are further to:
automatically generate the field information update based on at least one of:
performing an optical character recognition on the document,
inspecting the document, or
searching the document.

* * * * *